United States Patent [19]

Aschwanden et al.

[11] 4,084,177
[45] Apr. 11, 1978

[54] SECAM SUBCARRIER GENERATOR

[75] Inventors: Felix Aschwanden, Thalwil; Theodor Ernst Bart, Zurich, both of Switzerland

[73] Assignee: RCA Corporation, New York, N.Y.

[21] Appl. No.: 780,334

[22] Filed: Mar. 23, 1977

[30] Foreign Application Priority Data

Nov. 15, 1976 United Kingdom ............... 47547/76

[51] Int. Cl.² ............................................. H04N 9/40
[52] U.S. Cl. ................................................... 358/25
[58] Field of Search ........................... 358/14, 25, 23

[56] References Cited
FOREIGN PATENT DOCUMENTS 2,344,153 7/1975 Germany ............................ 358/25

Primary Examiner—John C. Martin
Attorney, Agent, or Firm—Eugene M. Whitacre; Paul J. Rasmussen; Mason DeCamillis

[57] ABSTRACT

A reference signal generator is provided for generating the two subcarrier reference frequencies for the SECAM television system. A master oscillator generates the first subcarrier reference frequency which is coupled to a divider for obtaining the horizontal line rate. The horizontal line rate is multiplied and coupled to a mixer, where it is mixed with the first subcarrier to obtain sum and difference frequencies. A crystal filter coupled to the mixer extracts the second subcarrier, which is locked in frequency and phase relationship to the first subcarrier. The signal generator also contains provisions for synchronizing the subcarriers to an external horizontal system reference.

3 Claims, 1 Drawing Figure

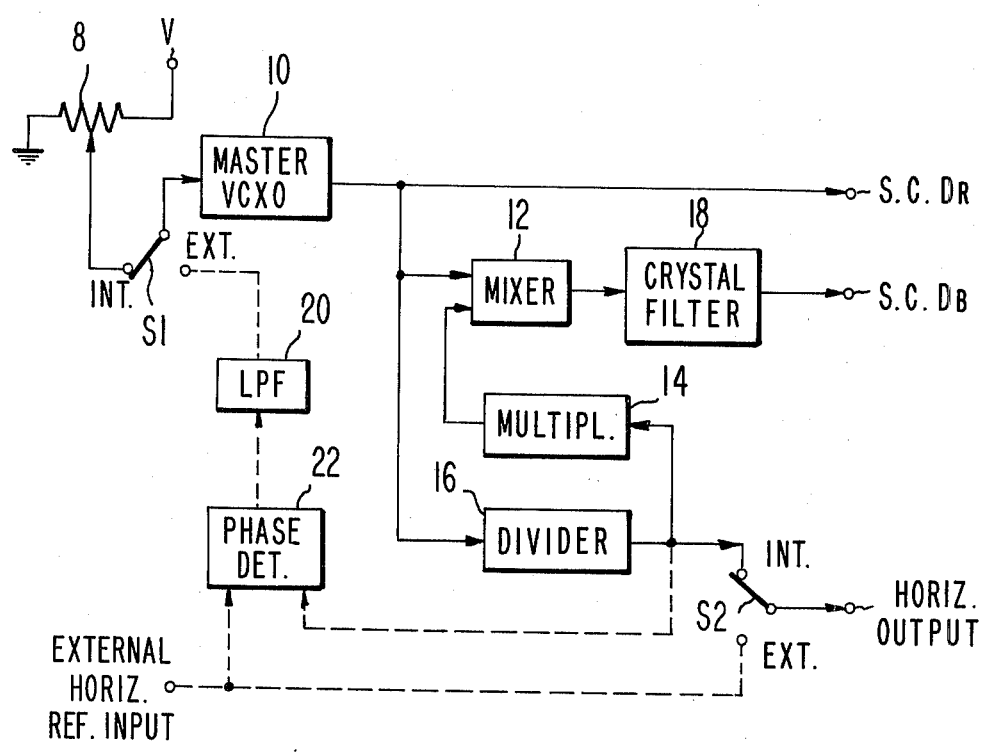

SECAM SUBCARRIER GENERATOR

BACKGROUND OF THE INVENTION

This invention relates to television signal generating apparatus, and especially to apparatus for generating the subcarrier frequencies for the SECAM television system.

In the SECAM television system, the color difference signals R-Y and B-Y are frequency modulated on two different subcarrier frequencies and transmitted separately on alternate horizontal lines of the video picture. The two subcarrier frequencies are specified in the SECAM television standards to be even multiples of the horizontal line rate of 15625 Hz, thus $D_R(R - Y)$ is established at a frequency of 282 × 15625 Hz or 4,406,250 Hz and $D_B(B - Y)$ at a frequency of 272 × 15625 Hz or 4,250,000 Hz. These two subcarrier reference frequencies $D_R$, $D_B$ are used to set the center frequency of the FM oscillator for alternate television lines during the horizontal blanking interval.

The most common prior art methods of generating the two subcarrier frequencies generally utilize a sharp, narrow pulse of approximately 0.1μsec duration occurring at the horizontal line rate to drive a pulse transformer for generating a wide spectrum of harmonics of the horizontal line frequency. Two crystals, one resonating at 4,406,250 Hz and the other at 4,250,000 Hz, arranged in a bridge configuration, filter the desired frequencies from the spectrum of harmonics of the horizontal line frequencies. Although of apparently simple design, this prior art method of subcarrier generation has several disadvantages in operation and signal quality; i.e., the desired frequencies at the output of the crystal filter are only approximately 12 to 15db higher than the unwanted harmonics of the spectrum and may vary in amplitude during the line duration due to the difficulty of harmonic generation based on the relatively low horizontal frequency rate and the critical width and shape of the driving pulse waveform. The addition of an amplifier/limiter combination to improve the quality of the derived subcarriers frequently introduces additional noise and distortion to the subcarrier signals generated in this manner.

SUMMARY OF THE INVENTION

A reference signal generator is provided for generating first and second subcarrier reference signals for use in a SECAM color television system. The first and second subcarrier reference signals are first and second multiples of the horizontal line rate of the television system. The reference generator comprises a first source of reference signals at the first multiple of the horizontal line rate for developing a first subcarrier reference signal. Divider means are coupled to the first source of reference signals for developing a line rate signal from the first reference signal. Multiplier means are coupled to the divider means for multiplying the line rate signal so as to develop an auxiliary signal source at a third multiple of the line rate signals lower than the first and second multiples. Signal mixing means are coupled to the first reference signal source and the auxiliary signal source for mixing the first reference and auxiliary signals. Filter means are coupled to the signal mixing means for providing the second subcarrier reference signal at the second multiple of the horizontal line rate.

BRIEF DESCRIPTION OF THE DRAWING

FIG. 1 is a block diagram of a subcarrier reference frequency generator embodying the present invention.

DESCRIPTION OF THE DRAWING

In FIG. 1, a master voltage controlled oscillator (VCXO) 10 is operated at one of the desired subcarrier frequencies; e.g., 4,406,250 Hz under control of a bias voltage adjustment 8 coupled between a source of voltage V and a point of reference (ground), thereby providing a constant amplitude output frequency at one of the desired subcarrier reference frequencies (S.C.D$_R$). The output of the VCXO is also coupled to one input terminal of mixer 12 and to the input terminal of a divider circuit 16. Divider circuit 16 is arranged in a known manner to divide the $D_R$ reference frequency output of the VCXO 10 by 282 to develop the horizontal line rate frequency of 15625 Hz. The output terminal of divider 16 is coupled to the input terminal of a multiplier circuit 14 which is arranged in a known manner to multiply the 15625 Hz output frequency of divider 16 by 10. The output of multiplier 14 at a frequency of 156250 Hz is coupled to the other input terminal of mixer 12. Mixer 12 produces at its output terminal the sum and difference of the frequencies applied to its input terminals, thus the output signal appearing at the output terminal of mixer 12 for the frequency examples described above are 4,406,250 Hz ± 156250 Hz, or 4562500 Hz and 4250000 Hz. Since the output frequency of VCXO 10 was chosen as 4,406,250 Hz to produce the $D_R$ subcarrier, the difference frequency of 4250000 Hz is the desired frequency for the $D_B$ subcarrier. The desired frequency is obtained by coupling the sum and difference frequencies at the output of mixer 12 to a crystal filter and amplifier 18 arranged to resonate at the difference frequency of 4,250,000 Hz for developing the second subcarrier $D_B$ at its ouput terminal. The first and second subcarriers are now in the form of stable CW waveforms of negligible distortion locked in frequency and phase to each other with the undesired components at multiples of the line frequency more than 40db down.

The use of a master voltage controlled crystal oscillator (VCXO) 10 also provides the means for synchronizing the subcarrier and line frequency generation to an external synchronizing signal for genlock functions. In FIG. 1, the external synchronizing elements are shown in dotted form and operate as follows. Switches $S_1$ and $S_2$ shown diagrammatically are operated in conjunction and placed in the external (EXT) position. The EXT horizontal reference signal at the system frequency and phasing of 15625 Hz is coupled to the horizontal output terminal at switch $S_2$ and to one input terminal of a phase detector 22. The other input terminal of phase detector 22 is coupled to the output of divider 16. Phase detector 22 compares the phasing of the external reference synchronizing signal at 15625 Hz with the 15625 Hz derived from master oscillator (VCXO) 10 by means of divider 16. The output signal of phase detector 22 is a direct current control voltage representative of any phase difference between the signals applied to the input terminals of phase detector 22. The control signal output of phase detector 22 is coupled to a low-pass filter 20 and, in turn, to the control terminal of master VCXO 10 by means of switch $S_1$ which has been placed in the EXT position. Thus, phase detector 22 and filter 20 form a feedback loop to insure that the phase and frequency of the master VCXO 10 and the resultant subcarrier references $D_R$ and $D_B$ are maintained synchronous with the external synchronizing signal reference.

What is claimed is:

1. A reference signal generator for generating first and second subcarrier reference signals for use in a SECAM color television system, said first and second subcarrier reference signals being first and second multiples of the horizontal line rate of said television system, comprising:

a first source of reference signals at said first multiple of said horizontal line rate for developing said first subcarrier reference signal;

divider means coupled to said first source of reference signals for developing a line rate signal from said first reference signal;

multiplier means coupled to said divider means for multiplying said line rate signals so as to develop an auxiliary signal source at a third multiple of said line rate signals lower than said first and second multiples;

signal mixing means coupled to said first reference signal source and said auxiliary signal source for mixing said first reference and auxiliary signals; and filter means coupled to said signal mixing means for providing said second subcarrier reference signal at said second multiple of said horizontal line rate.

2. A reference signal generator according to claim 1 wherein said signal mixing means develops sum and difference signals of said first reference and auxiliary signals.

3. A reference signal generator according to claim 1 further comprising phase detector means responsive to said line rate signal developed from said first reference signal and an external reference signal source at substantially the same frequency as said line rate signal for developing a phasing control signal for synchronizing said reference signal generator to said external reference signal source.

* * * * *